United States Patent
Gondre et al.

(10) Patent No.: US 10,858,943 B2
(45) Date of Patent: Dec. 8, 2020

(54) FAN FOR AIRCRAFT TURBOMACHINE

(71) Applicant: SAFRAN AIRCRAFT ENGINES, Paris (FR)

(72) Inventors: Guillaume Pascal Jean-Charles Gondre, Serris (FR); Paul Antoine Foresto, Fontainebleau (FR); Stéphane Roger Mahias, Montrouge (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 411 days.

(21) Appl. No.: 15/714,112

(22) Filed: Sep. 25, 2017

(65) Prior Publication Data

US 2018/0087386 A1     Mar. 29, 2018

(30) Foreign Application Priority Data

Sep. 26, 2016   (FR) .................................... 16 59030

(51) Int. Cl.
    *F01D 5/14*     (2006.01)
    *F01D 21/04*     (2006.01)
    (Continued)

(52) U.S. Cl.
    CPC ............... *F01D 5/147* (2013.01); *F01D 5/16* (2013.01); *F01D 5/34* (2013.01); *F01D 21/045* (2013.01); *F05D 2240/304* (2013.01); *F05D 2240/80* (2013.01); *F05D 2250/141* (2013.01); *F05D 2250/294* (2013.01); *F05D 2250/75* (2013.01); *F05D 2260/941* (2013.01);
    (Continued)

(58) Field of Classification Search
    CPC .......... F01D 21/045; F01D 5/147; F01D 5/16; F01D 5/34; F05D 2240/304; F05D 2240/80; F05D 2250/141; F05D 2250/294; F05D 2250/75; F05D 2260/941; F05D 2300/437; F05D 2300/501; Y02T 50/671; Y02T 50/673
See application file for complete search history.

(56) References Cited

U.S. PATENT DOCUMENTS

| | | | | |
|---|---|---|---|---|
| 3,904,317 A | * | 9/1975 | Cardin | .................... F01D 5/326 416/220 R |
| 7,160,084 B2 | * | 1/2007 | Ahmad | .................... F01D 5/143 416/231 B |

(Continued)

FOREIGN PATENT DOCUMENTS

| | | |
|---|---|---|
| EP | 1 857 636 A1 | 11/2007 |
| EP | 2 602 441 A1 | 6/2013 |

(Continued)

OTHER PUBLICATIONS

Search Report issued in French Patent Application No. 1659030 dated Jul. 20, 2017.

*Primary Examiner* — Carl C Staubach
(74) *Attorney, Agent, or Firm* — Pearne & Gordon LLP

(57) ABSTRACT

The invention relates to a fan blink (28) for an aircraft turbomachine, comprising a hub, an annular platform (42) and fan blades (44) arranged projecting from the annual platform. It also comprises a mechanical discharge slit (52) from a trailing edge (49) of the fan blade, associated with at least one of the fan blades (44), for the case of ingestion of a bird, the slit being made on the annular platform (42) going around the trailing edge (49).

12 Claims, 5 Drawing Sheets

(51) Int. Cl.
 *F01D 5/16* (2006.01)
 *F01D 5/34* (2006.01)

(52) U.S. Cl.
 CPC .. *F05D 2300/437* (2013.01); *F05D 2300/501* (2013.01); *Y02T 50/60* (2013.01)

(56) References Cited

U.S. PATENT DOCUMENTS

| | | | | |
|---|---|---|---|---|
| 7,597,536 B1 * | 10/2009 | Liang | ............. | F01D 25/12 |
| | | | | 415/138 |
| 7,736,128 B2 * | 6/2010 | Huber | ............. | F03B 3/121 |
| | | | | 416/186 R |
| 8,177,502 B2 * | 5/2012 | Headley | ............. | F01D 9/041 |
| | | | | 415/209.3 |
| 9,017,022 B2 * | 4/2015 | Bertoli | ............. | F01D 5/225 |
| | | | | 415/210.1 |
| 9,556,749 B2 * | 1/2017 | Pauli | ............. | F01D 25/14 |
| 2010/0129210 A1 * | 5/2010 | Headley | ............. | F01D 9/041 |
| | | | | 415/209.3 |
| 2011/0286834 A1 * | 11/2011 | Wardle | ............. | F01D 9/041 |
| | | | | 415/115 |
| 2012/0051938 A1 * | 3/2012 | Bertoli | ............. | F01D 9/041 |
| | | | | 416/241 R |
| 2015/0267545 A1 | 9/2015 | Merlot | | |
| 2016/0138403 A1 | 5/2016 | Merlot | | |
| 2016/0153467 A1 | 6/2016 | Mahias | | |

FOREIGN PATENT DOCUMENTS

| | | |
|---|---|---|
| FR | 2 945 331 A1 | 11/2010 |
| FR | 3 010 442 A1 | 3/2015 |
| FR | 3 027 340 A1 | 4/2016 |
| FR | 3 028 574 A1 | 5/2016 |
| FR | 3 033 359 A1 | 9/2016 |

* cited by examiner

FAN FOR AIRCRAFT TURBOMACHINE

TECHNICAL DOMAIN

This invention relates to aircraft turbomachines, and preferably to turbojets. More precisely, it relates to the design and fabrication of a fan blisk.

STATE OF PRIOR ART

The fan is a particularly complex part, designed by specialised teams so as to simultaneously treat aerodynamic, acoustic and mechanical aspects specific to this rotating part, located at the front of turbojets. Mechanical strength is a major concern, particularly the resistance to ingestion of birds. Therefore the blades of a blisk must resist a bird impact without breaking to avoid the creation of blade debris. In the case of a breakage causing such debris, the debris must be contained inside the fan case. This requirement can lead to the case being overdesigned, with the result of increasing the global mass of the turbojet.

This mechanical problem is particularly severe in the case of a blisk, the dynamic behaviour of which in the case of a bird impact is significantly different from the behaviour encountered on more conventional parts such as a disk fitted with add-on blades.

One solution to this mechanical problem has been disclosed in document FR 3 010 442, by increasing the fillet radius between the trailing edge of each blade and the annular platform of the disk. This can reduce stresses in this highly loaded area in the case of a bird impact. Nevertheless, this solution requires that a flow stream reformation part has to be added onto the fan blisk, increasing the global mass and making fabrication more complex.

Thus, there is a need to optimise the design of this special turbomachine part composed of the fan blisk, particularly concerning its ability to resist a bird impact while having low mass.

SUMMARY OF THE INVENTION

In order to satisfy this need, the primary purpose of the invention is a fan blisk for an aircraft turbomachine, the blisk comprising a hub, an annular platform and fan blades arranged projecting from the annual platform. According to the invention, it also comprises a mechanical discharge slit from a trailing edge of the fan blade, associated with at least one of the fan blades, for the case of ingestion of a bird, the slit being made on the annular platform going around said trailing edge.

Thus, in the case of a bird impact, the partial discharge slit can transfer stresses related to the impact to a distance from the sensitive zone at the trailing edge. More precisely, these maximum stresses are shifted to the ends of the slit, and reduced due to the flexibility added due to the presence of this slit. The result is advantageously a significant reduction in the risk of a breakage of the blades, without requiring any additional parts. On the contrary, the discharge slit reduces the mass of the annular platform of the fan blisk.

The invention also has at least any one of the following optional characteristics, taken in isolation or in combination.

According to a first preferred embodiment of the invention, the discharge slit is closed on one face, with a bottom and an opening opposite the bottom along a radial direction of the blisk. The closed/open slit in this case is in the form of a non-through discharge slit, in other words it opens up on only one face of the platform.

Preferably, the discharge slit is formed on a radially inner surface of the annular platform, to open up radially inwards. This means that the opposite surface of the platform, along which the total air flow entering the turbomachine flows, can be left intact. This solution thus provides an ingenious solution to the aerodynamic problem associated with the fan blisk, by judiciously using the surface of the platform opposite to the surface that connects the blade trailing edge, to position the discharge slit. Nevertheless, as an alternative, the discharge slit could be made on the radially outer surface of the annular platform without going outside the framework of the invention.

Preferably, the cross-section of the surface delimiting the discharge slit is in the form of a segment of a circle, a segment of an ellipse or a segment of a polygon.

Preferably, the ligament of material defined between the bottom of the slit and the surface of the platform opposite the surface on which the slit is formed, acts as a mechanical fuse in the case of a bird impact on the blade associated with this slit. After breakage of this mechanical fuse caused by a bird impact, the zone is even more flexible and risks of breakage are limited.

According to a second preferred embodiment of the invention, the discharge slit is formed passing through the annular platform, said slit preferably being filled by a filling material to satisfy the aerodynamic problem.

Regardless of which embodiment is envisaged, the discharge slit may for example be in the general shape of a U, or V, or horseshoe, the two opposite ends of the slit preferably being widened so as to reduce applied stresses.

Preferably, the average width of the discharge slit is between 3 and 8 mm, and even more preferably between 5 and 7 mm. Nevertheless, the average width may also be about 2 mm, or about 10 mm.

Preferably, the discharge slit extends on each side of the blade over a distance of more than 2 cm from the trailing edge. The above-mentioned distance may be equivalent to at least one third of the length of the skeleton of the blade concerned, to optimise the increase in flexibility of the blade concerned.

Finally, another purpose of the invention is an aircraft turbomachine comprising a fan blisk like that described above. It is preferably a twin-spool turbojet.

Other advantages and characteristics of the invention will become clear after reading the following non-limitative detailed description.

BRIEF DESCRIPTION OF THE DRAWINGS

This description will be made with reference to the appended drawings among which:

FIG. 6a is a sectional view along line VI-VI on FIG. 5, while

DETAILED DESCRIPTION OF PREFERRED EMBODIMENTS

Figure 1:
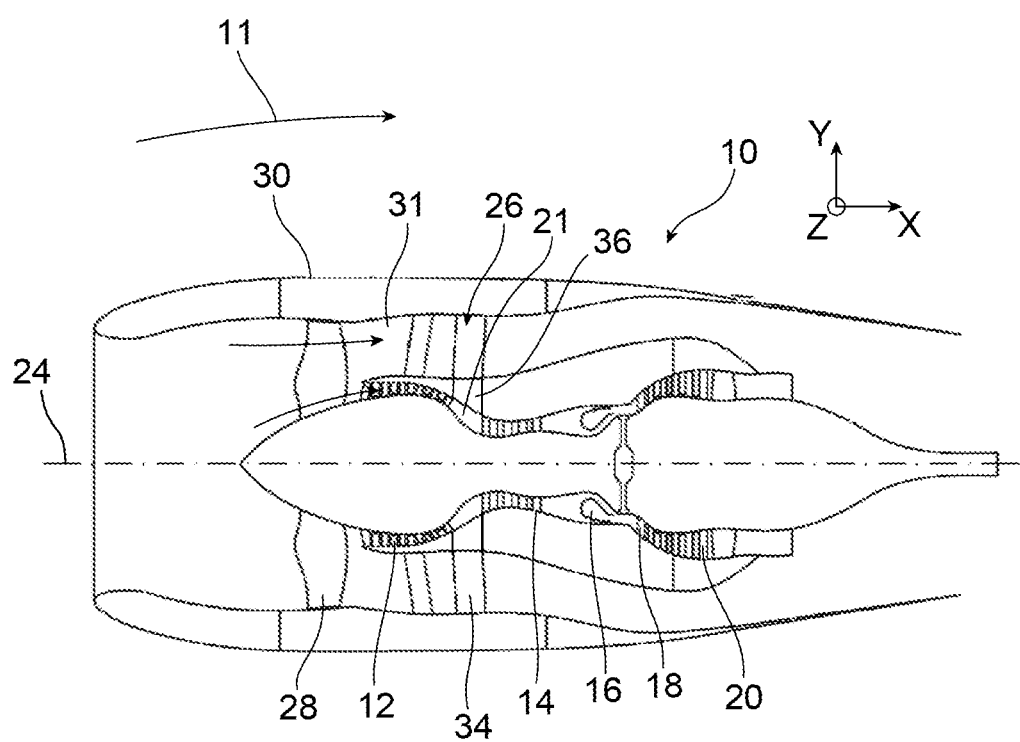
FIG. 1 diagrammatically represents an axial sectional view of a twin-spool turbojet according to the invention.
Figure 2:
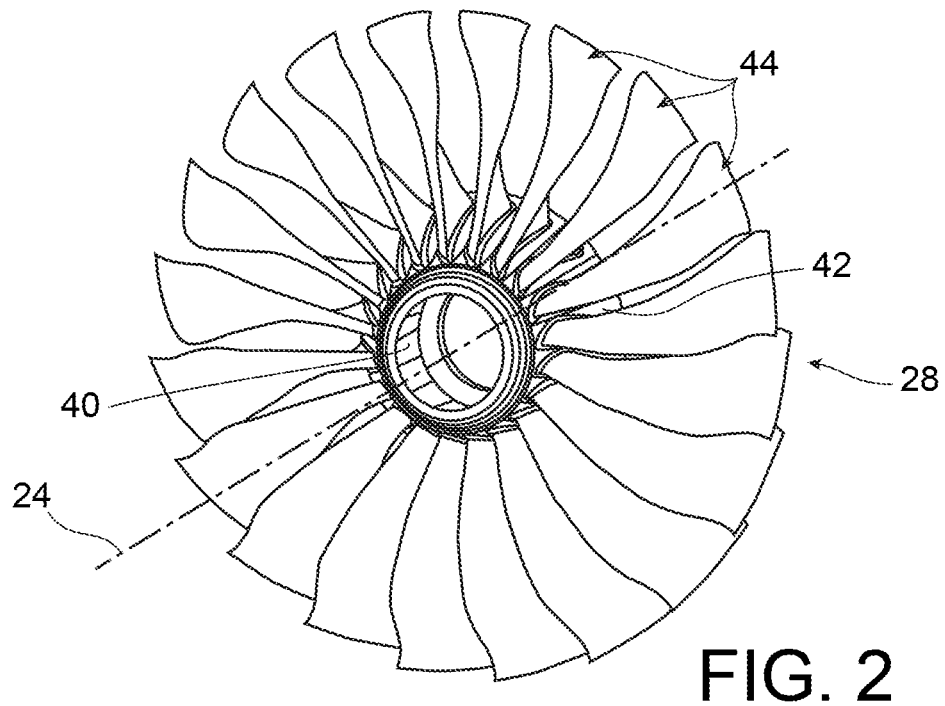
FIG. 2 represents a perspective view of a fan blisk installed on the turbojet shown on FIG. 1, the disk being in the form of a first preferred embodiment of the invention.
Figure 3:
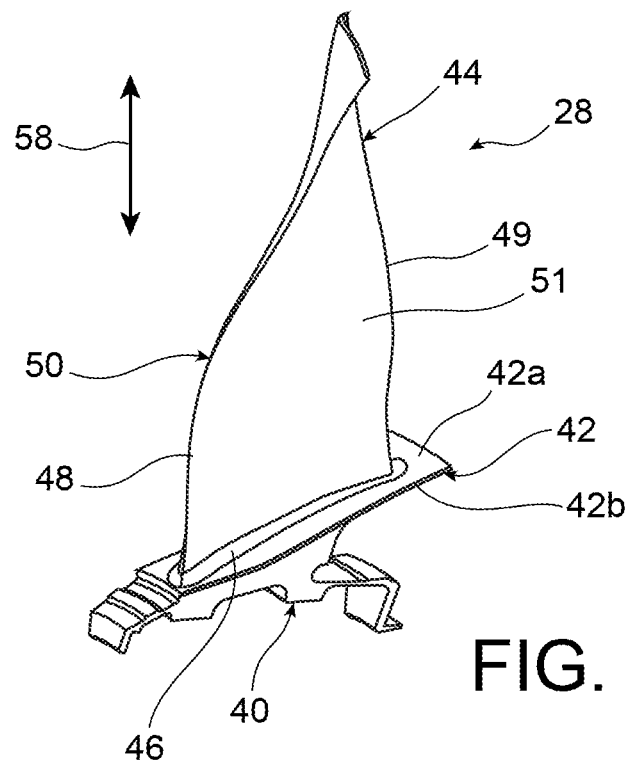
FIG. 3 is a perspective view of an angular segment of the blink shown on the previous figure.
Figure 4:
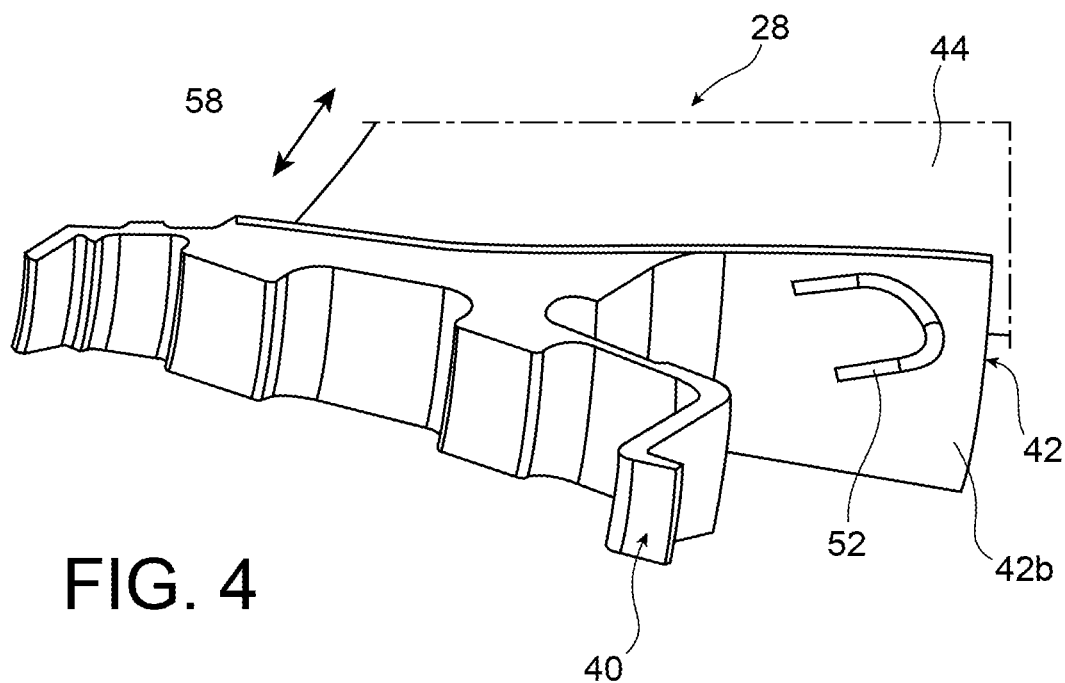
FIG. 4 is a perspective view of the angular segment shown on the previous figure, from a different viewing angle.
Figure 5:
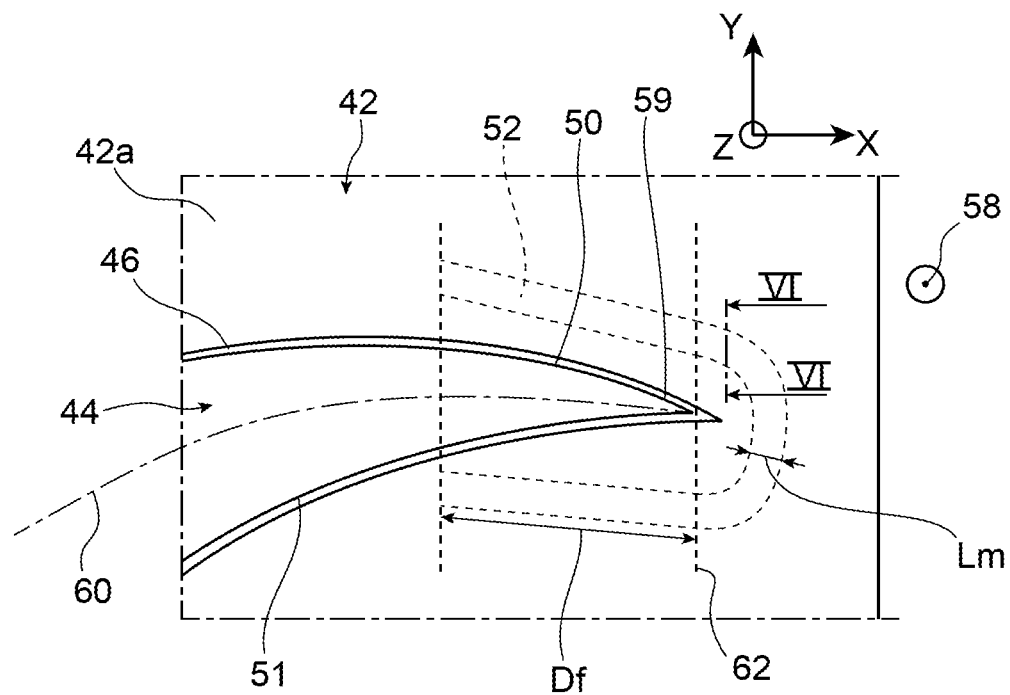
FIG. 5 is a partial radial view of the angular segment shown on FIGS. 3 and 4, seen from the outside.

As illustrated on FIG. 1 that is a diagrammatic axial sectional view of a twin-flow twin-spool turbojet 10 according to the invention, the turbojet comprises, starting at the upstream end and working towards the downstream end along a principal gas flow stream shown diagrammatically by the arrow 11, a low pressure compressor 12, a high pressure compressor 14, a combustion chamber 16, a high pressure turbine 18 and a low pressure turbine 20, that define a core path 21 through which a core engine gas flow 22 passes. The high pressure turbine 18 is fixed to the high pressure compressor 14 so as to form a high pressure case, while the low pressure turbine 20 is fixed to the low pressure compressor 12 so as to form a low pressure body, such that each turbine drives the associated compressor in rotation about a longitudinal axis of the turbojet 24, under the effect of the gas thrust from the combustion chamber 16.

An intermediate case 26 is usually positioned between the low pressure compressor 12 and the high pressure compressor 14.

In the case of twin-spool turbojets that comprise a fan 28 surrounded by a pod 30 to generate a fan flow 32 through a fan flow stream 31, the intermediate case 26 usually comprises outlet guide vanes 34 passing through this flow stream 31. These Outlet Guide Vanes 34 are also referred to by the abbreviation OGV.

The invention is more particularly applicable to the fan 28, the rotating part of which is composed of a fan blisk, denoted the fan blisk 28 in the remainder of this description and a first preferred embodiment of which will now be described with reference to FIGS. 2 to 7.

The blisk 28 is a rotating metal part with axis 24, made from a single part comprising a hub 40 around which an annular platform 42 is formed. This part also comprises fan blades 44 arranged to project radially outwards from the annular platform 42. More precisely, the blades 44 extend outwards from a radially outer surface 42a, opposite a radially inner surface 42b. There is a fillet radius 46 at the radially outer surface 42a, between the base of each blade 44 and this same surface 42a. The fillet radius extends all around the blade, along the intrados 51, the leading edge 48, the extrados 50 and the trailing edge 49, as can be seen on FIGS. 3 and 5.

The remainder of the description relates to an angular sector of blisk 28 comprising a single blade 44, but it is understood that the invention is preferably applicable to all other angular segments making up the blisk 28.

One of the special features of the invention lies in the creation of a mechanical discharge slit in the trailing edge 49 of the blade 44, that creates some flexibility in the blisk 28 in the case in which a bird is ingested by the fan. In this first preferred embodiment, the mechanical discharge slit 52 is formed opening up on a single face of the platform, in other words it is closed at the radially outer surface 42a of the platform, but is open on the radially inner surface 42b. In other words, the slit 52 has a bottom 54 and an opening 56 opposite the bottom along the radial direction of the blisk 28, this direction being shown diagrammatically by the arrow 58. Thus, the slit 52 does not disturb the total air flow on the surface 42a, from which the blades extend.

The mechanical discharge slit 52 bypasses the trailing edge 49. In other words, looking along a radial view like that shown on FIG. 5, the slit 52 closed off by the surface 42a is located at a distance from the trailing edge 49 and at a distance from the intrados part 51 and the extrados part 50 located close to this trailing edge. In this case, the slit 52 is in a generally U shape, although other similar shapes could be adopted such as a generally V shape or a horseshoe shape.

In this configuration, also looking in a radial view from the outside and considering the slit 52 visible through the transparent platform 42, the bottom of the trailing edge 49 is housed in the recess of the U formed by the slit. The legs of the U are preferably the same length, although they could have different lengths within the framework of the invention. Therefore one leg runs along the intrados 51 and the other leg runs along the extrados 50 of the blade, at a distance from these aerodynamic surfaces, and also at a distance from the fillet radius 46. The two legs also lie at approximately the same distance from a blade skeleton 60 referenced on FIG. 5, preferably being approximately parallel to this skeleton 60.

The average width "Lm" of the slit 52 is preferably between 5 and 7 mm. Less precisely, the width of the slit can be within an interval between 3 and 8 mm. For small blades, for example with a radial length of 40 cm, the width of the slit could be about 2 mm. For larger blades, for example with a radial length of 100 cm, the width of the slit can possibly be increased to about 10 mm. Furthermore, each leg of the U extends from the trailing edge 49 over a slit distance "Df" exceeding 2 cm, along the direction of the skeleton 60. Even more preferably, in order to optimise flexibility of the sensitive area of the blisk 28, the distance Df can be equal to at least one third of the total length of the blade skeleton 60, for example up to half of the total length of this skeleton. In this respect, note that the distance Df shown on FIG. 5 starts from a straight line 62 approximately orthogonal to the skeleton 60, locally at the trailing edge 49.

Figure 6A:
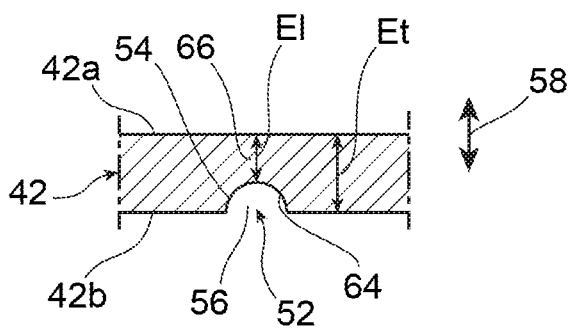
Figure 6B:
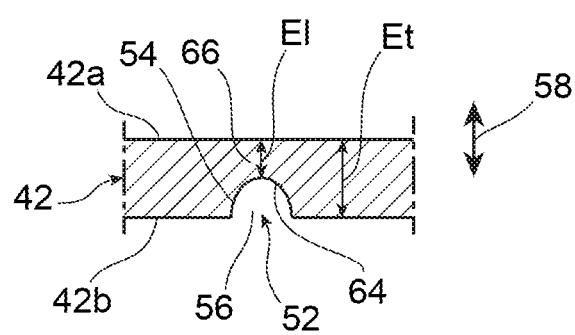
FIGS. 6b and 6c are similar views illustrating alternative embodiments.
Figure 6C:
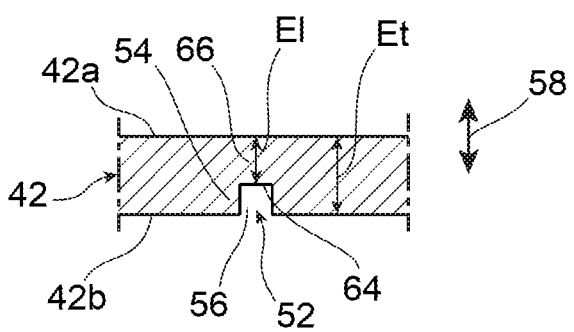
Figure 7:
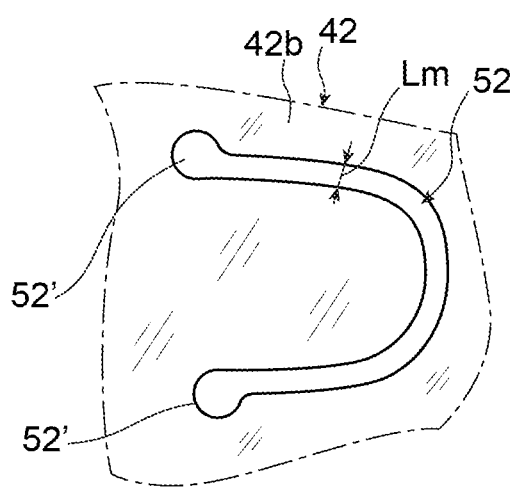
FIG. 7 shows an alternative embodiment for the discharge slit installed on the angular disk segment.

The surface 64 that delimits the discharge slit 52 can have a cross-section in the form of a half-circle, like that shown in FIG. 6a. Other solutions could be envisaged, such as a segment of an ellipse or of a polygon such as a quadrilateral as shown on FIGS. 6b and 6c respectively. Therefore, regardless of the shape of the slit 52, a ligament of material 66 with a thickness "El" remains between the bottom 54 and the surface 42a of the annular platform 42. The thickness El may for example be between 0.3 and 0.5 times the total thickness "Et" of the platform. The purpose is to assure that the ligament 66 is sufficiently strong to maintain the mechanical strength of the blade during nominal operation, while being capable of breaking like a mechanical fuse on the case of a bird impact on the blade. Due to this fuse function of the ligament of material, after impact on the blade, the zone is even more flexible and the risks of the blade breaking are advantageously limited.

After breaking, stresses related to the bird impact are transferred to the two opposite ends the discharge slit 52, at a distance from the sensitive zone of the trailing edge 49. Moreover, in order to reduce the maximum stresses at the trailing edge in addition to simply moving the maximum stress zone away from this trailing edge, the ends of the slit 52' preferably have significantly wider dimensions that the average width Lm of the remainder of the slit. As shown diagrammatically on FIG. 7, the ends 52' are preferably circular in shape, to improve the stress distribution.

Figure 8:
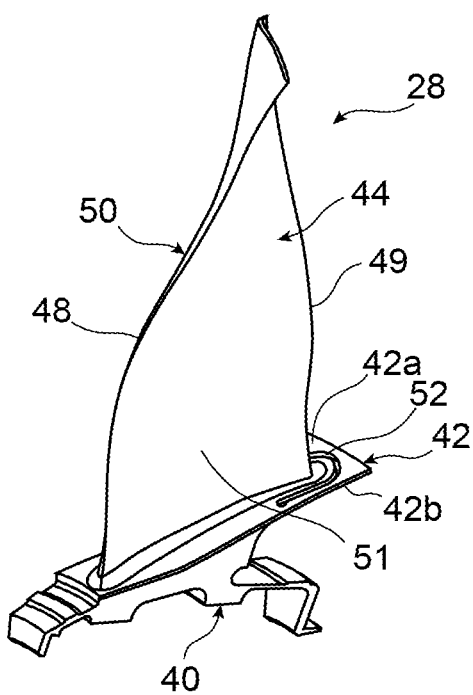
FIG. 8 is a view corresponding to the view shown on FIG. 3, with the angular disk segment being in the form of a second preferred embodiment of the invention.
Figure 9:
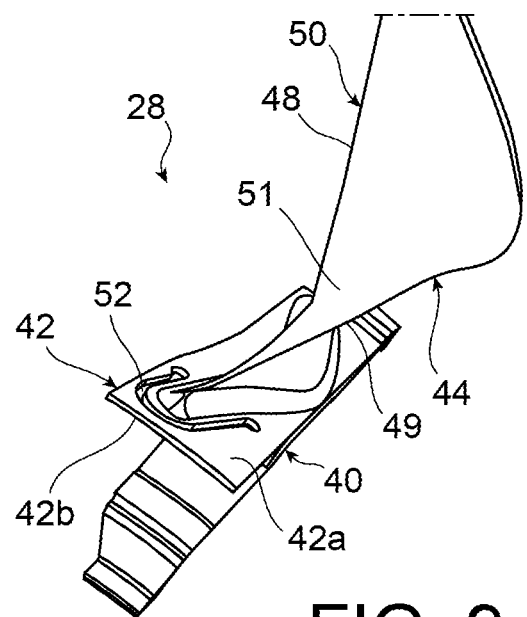
FIG. 9 is a perspective view corresponding to the previous view, from a different viewing angle.
Figure 10:
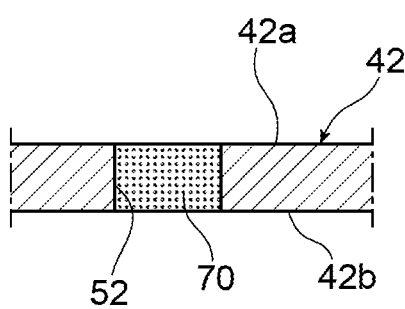
FIG. 10 is a sectional view of the annular platform installed on the angular disk segment shown on FIGS. 8 and 9.

FIGS. 8 to 10 represent a second preferred embodiment of this invention, that has many technical characteristics in common with the first embodiment described above. Elements shown on the figures that have the same numeric references relate to identical or similar elements. In this second embodiment, the only difference lies in the mechanical discharge slit 52 that is no longer closed, but is a through slit. In other words, the slit 52 opens up at each of two opposite surfaces 42a, 42b of the annular platform 42. In this second embodiment, the slit 52 may be filled in by a filling material 70 with low rigidity, for example based on silicone, to limit aerodynamic disturbances to the total air flow ingested by the fan.

Figure 11:
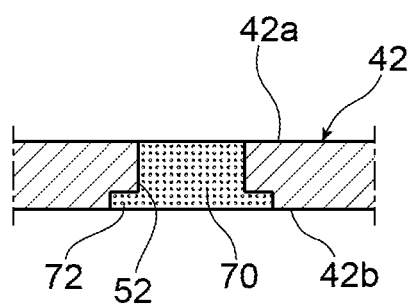
FIG. 11 is a sectional view showing a variant embodiment of the annular platform installed on the angular disk segment shown on FIGS. 8 and 9.

FIG. 11 shows a variant embodiment like that shown in FIG. 10, with a shoulder 72 in the discharge slit 52, this shoulder improving the behaviour of the filling material 70.

Obviously, an expert in the subject can make various modifications to the invention that has just been described solely as non-limitative examples.

The invention claimed is:

1. A fan (28) for an aircraft turbomachine, the fan (28) comprising:
   a hub (40);
   an annular platform (42);
   fan blades (44) arranged projecting from the annual platform (42); and
   a mechanical discharge slit (52) associated with one fan blade (44) of the fan blades (44), the mechanical discharge slit (52) being made on the annular platform (42) going around a trailing edge (49) of the one fan blade (44),
   wherein the mechanical discharge slit (52) extends partially into the annular platform (42) in a radial direction (58) of the fan (28),
   wherein the mechanical discharge slit (52) is a blind hole that is formed on a radially inner surface (42b) of the annular platform (42) and opens radially inwards.

2. The fan (28) according to claim 1, wherein the discharge slit (52) is closed on one face, with a bottom (54) and an opening (56) opposite the bottom along a radial direction (58) of the blisk.

3. The fan (28) according to claim 2, wherein a radial cross-section of a surface (64) delimiting the mechanical discharge slit (52) is in the form of a segment of a circle, a segment of an ellipse, or a segment of a polygon.

4. The fan (28) according to claim 2, wherein a ligament of material (66) defined between the bottom (54) of the mechanical discharge slit (52) and a radially outer surface of the platform (42a) acts as a mechanical fuse.

5. The fan (28) according to claim 1, wherein the discharge slit (52) is in the shape of a U, or V, or horseshoe.

6. The fan (28) according to claim 1, wherein an average width (Lm) of the mechanical discharge slit (52) is between 3 and 8 mm.

7. The fan (28) according to claim 1, wherein the mechanical discharge slit (52) extends on each side of the one fan blade (44) over a distance (Df) of more than 2 cm from the trailing edge (49).

8. An aircraft turbomachine (10) comprising the fan (28) according to claim 1.

9. The fan (28) according to claim 5, wherein two opposite ends (52') of the mechanical discharge slit (52) are widened.

10. The fan (28) according to claim 1, wherein an average width (Lm) of the mechanical discharge slit (52) is between 5 and 7 mm.

11. The fan (28) according to claim 1, wherein the fan blades (44) and hub (40) are integral components of a single part.

12. A turbojet (10) comprising the fan (28) according to claim 1, wherein the fan (28) is rotatable about a longitudinal axis of the turbojet (10).

* * * * *